(12) United States Patent
Hammel

(10) Patent No.: US 10,122,833 B2
(45) Date of Patent: Nov. 6, 2018

(54) TIME STAMP CONVERSION IN AN INTERFACE BRIDGE

(71) Applicant: Raytheon Company, Waltham, MA (US)

(72) Inventor: Bradley Bomar Hammel, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 307 days.

(21) Appl. No.: 15/048,752

(22) Filed: Feb. 19, 2016

(65) Prior Publication Data
US 2017/0244813 A1    Aug. 24, 2017

(51) Int. Cl.
| H04L 29/06 | (2006.01) |
| H04L 12/875 | (2013.01) |
| G06F 13/20 | (2006.01) |
| G06F 13/10 | (2006.01) |
| G06F 13/40 | (2006.01) |

(52) U.S. Cl.
CPC ............ H04L 69/08 (2013.01); G06F 13/102 (2013.01); G06F 13/20 (2013.01); G06F 13/4027 (2013.01); H04L 47/562 (2013.01)

(58) Field of Classification Search
None
See application file for complete search history.

(56) References Cited

U.S. PATENT DOCUMENTS

| 2012/0150365 A1* | 6/2012 | Maxwell | B64D 1/04 701/3 |
| 2015/0082975 A1* | 3/2015 | Huber | F42C 17/00 89/1.11 |
| 2015/0089099 A1* | 3/2015 | Huber | G06F 13/387 710/105 |
| 2015/0370752 A1* | 12/2015 | Hammel | G06F 13/4282 710/105 |

* cited by examiner

Primary Examiner — Philip Chea
Assistant Examiner — Hassan Khan

(57) ABSTRACT

A technology is described for converting a time tag in a message. The message can be received from a military standard-1760 (MIL-STD-1760) bus controller. The message can include a time tag in accordance with a first time stamping technique. The time tag in the message can be detected as being in accordance with the first time stamping technique based on contents of the message. A recomputed time tag for the message can be determined in accordance with a second time stamping technique. The message with the recomputed time tag can be transmitted to a Universal Armament Interface (UAI) remote terminal.

23 Claims, 6 Drawing Sheets

TIME STAMP CONVERSION IN AN INTERFACE BRIDGE

BACKGROUND

Aerial vehicles, such as attack aircraft or fighter aircraft (e.g., Boeing or McDonnell Douglas F/A-18 C/D/E/F Hornet or Lockheed Martin or General Dynamics F-16 Fighting Falcon) or unmanned aerial vehicle (UAV) (e.g., General Atomics MQ-1 Predator or MQ-9 Reaper (Predator-B)) can carry various munitions (e.g., bombs or missiles). The munitions can be carried on carriage racks (e.g., a single carriage or a dual carriage), such as a bomb release unit (BRU) (e.g., Boeing BRU-61/A). Furthermore, aerial vehicles can use a messaging protocol (e.g., military standard-1760 (MIL-STD-1760)) to control, monitor, and release the munitions on the carriage racks.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
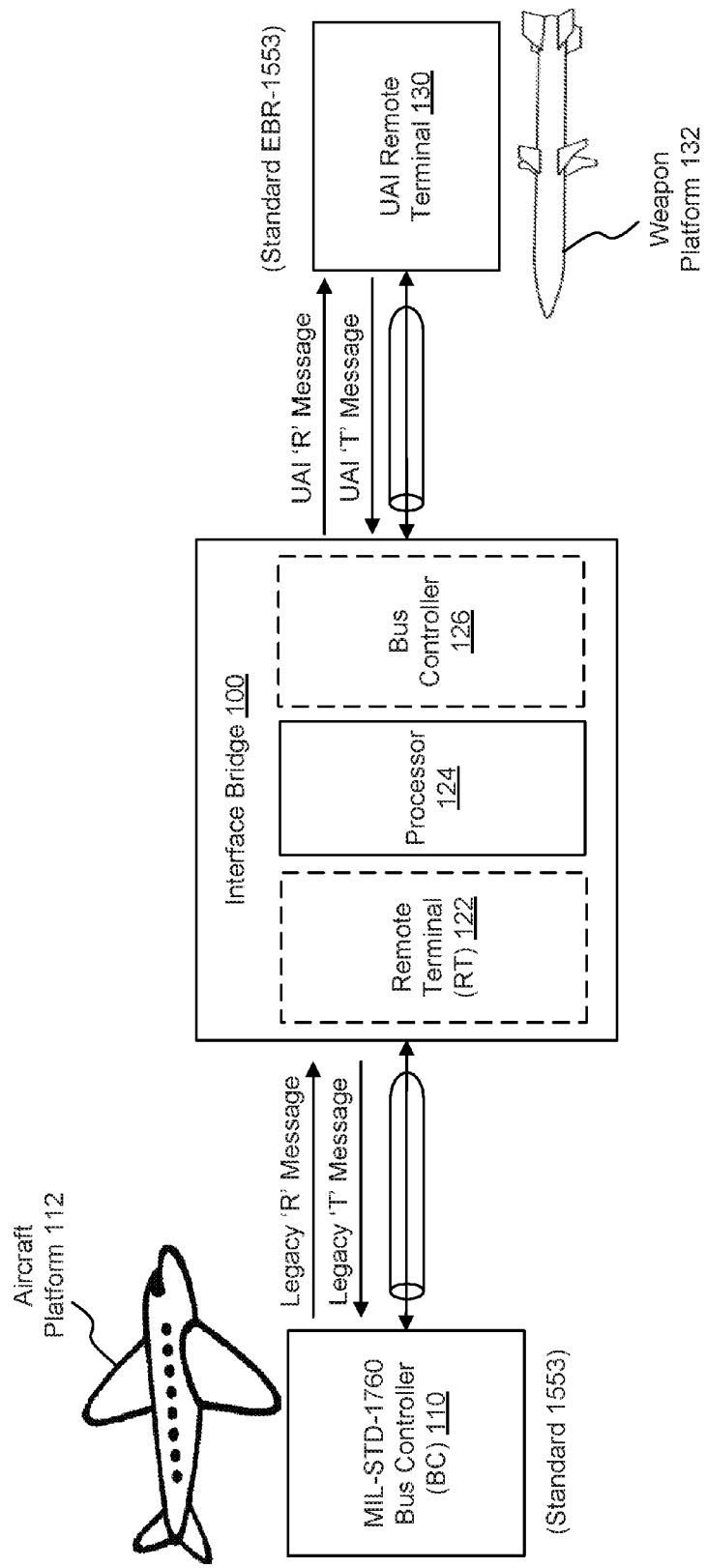
FIG. 1 illustrates a functional diagram of an interface bridge positioned between a military standard-1760 (MIL-STD-1760) bus controller on an aircraft platform and a Universal Armament Interface (UAI) remote terminal on a weapon platform in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for converting, at an interface bridge, a time tag derived using a first time stamping technique to a time tag that uses a second time stamping technique. The interface bridge can be positioned between a military standard-1760 (MIL-STD-1760) bus controller on an aircraft platform and a Universal Armament Interface (UAI) remote terminal on a weapon platform. The interface bridge can receive a message from the MIL-STD-1760 bus controller that includes the time tag, wherein the time tag is derived in accordance with the first time stamping technique. The interface bridge can detect that the message is time stamped in accordance with the first time stamping technique based on the contents of the message. The interface bridge can determine a recomputed time tag for the message in accordance with the second time stamping technique when the time tag is derived in accordance with the first time stamping technique. The interface bridge can transmit the message with the recomputed time tag to the UAI remote terminal.

Many modern weapons (e.g., air-to-ground weapons) can implement a Universal Armament Interface (UAI). The UAI can be a logical or messaging interface allowing for a standardized message structure for various modern weapons and aircraft platforms. For example, miniature munitions (e.g. small diameter bomb (SDB) I (SDB-I) and SDB-II) that implement the UAI can use an Enhanced Bit Rate-1553 (EBR-1553) protocol. These small munitions can mount to a multi-position carriage system, which can provide interface translation, and carriage and/or ejection functions. However, some aircraft platforms that launch these weapons do not implement a UAI. Rather, some of the existing aircraft platforms implement a military standard-1760 (MIL-STD-1760) interface in which a MIL-STD-1553 protocol is used, wherein the MIL-STD-1760 interface on the aircraft platform is incompatible with the UAI on the weapon. The MIL-STD-1760 interface can also be referred to as a legacy interface. Furthermore, the effort (e.g., cost and development) to implement a UAI capability into such aircraft platform's avionics can require significant platform avionics software upgrades and/or modifications to the weapon's software.

In one example, an interface bridge can provide real-time logical or messaging translation between the MIL-STD-1760 interface and a UAI, which includes miniature munitions (MM) interfaces (e.g., joint miniature munitions interface (JMMI) and miniature munitions store interface (MMSI)). The interface bridge can eliminate a need for an expensive carriage or modifications to an aircraft platform hardware interface. Thus, the interface bridge can significantly reduce integration costs for miniature munitions, and can facilitate carriage of miniature munitions on a MIL-STD-1760 platform (e.g., with 14" lugs (i.e., mounts for miniature munitions)).

In one example, the interface bridge can handle translation (or pass-through) of analog signals used for interface functionality. Power can be derived from the power provided by the aircraft platform to drive a weapon (e.g., miniature munitions). The interface bridge can be housed or packaged in a ruggedized connector body, which can be attached directly into an aircraft umbilical connector, and which can provide a connector to the miniature munitions interface.

FIG. 1 illustrates an interface bridge 100 translating between an aircraft platform 112 and a weapon platform 132, in accordance with one example of the present disclosure. More specifically, the interface bridge 100 can provide real-time, inline translation of a legacy interface on the aircraft platform 112, such as a military standard-1760 (MIL-STD-1760) interface, to a Universal Armament Interface (UAI) on the weapon platform 132. The interface bridge 100 can include capabilities to support multiple types of aircraft interfaces and platforms. The interface bridge 100 can allow a UAI weapon (e.g., SDB-II) to be integrated onto a platform that implements a legacy MIL-STD-1760 messaging interface, such as for an air-to-ground weapon (e.g., JDAM or Enhanced Paveway™), and can provide a logical messaging interface between the UAI weapon (e.g., the weapon platform 132) and a legacy aircraft platform (e.g., the aircraft platform 112).

The interface bridge 100 can operate as a remote terminal (RT) 122 for the aircraft platform 112, and the interface bridge 100 can operate as a bus controller (BC) 126 for the weapon platform 132. In other words, the interface bridge 100 can include the remote terminal 122 as an interface on the aircraft platform side, and the bus controller 126 as an interface on the weapon platform side. The aircraft platform 112 can utilize a 1553 protocol and the weapon platform 132 can utilize an Enhanced Bit Rate-1553 (EBR-1553) protocol. In addition, the interface bridge 100 can include at least one processor 124 (e.g., a central processing unit (CPU)) for providing physical layer and message layer translation between the MIL-STD-1760 interface of the aircraft platform 112 and the UAI interface of the UAI remote terminal 130. In other words, the interface bridge 100 can provide time stamp conversion, real-time message translation, data conversion, and data field manipulation so the message protocols can be understood between the aircraft platform 112 and the weapon platform 132. In addition, the interface bridge 100 can include software and/or hardware to implement the various functionalities provided by the interface bridge 100.

In one example, the interface bridge 100 can be placed anywhere in a path (i.e., inline) between a MIL-STD-1760 bus controller (BC) 110 of the aircraft platform 112 and a UAI remote terminal 130 of the weapon platform 132. For instance, the interface bridge 100 can be incorporated with controls of the aircraft platform 112 (e.g., in a cockpit) or located with a carriage rack.

In one example, the aircraft platform 112 can include the MIL-STD-1760 bus controller (BC) 162 for sending messages (e.g., legacy receive ('R') messages) to the weapon platform 132 and receiving messages (e.g., legacy transmit ('T') messages) from the weapon platform 132 via the MIL-STD-1760 interface. The weapon platform 132 can include the UAI remote terminal 130 for sending messages (e.g., UAI transmit ('T') messages) to the aircraft platform 112 and receiving messages (e.g., UAI receive ('R') messages 174) from the aircraft platform 112 via the UAI interface. In other words, the interface bridge 100 can convert legacy 'R' messages from the MIL-STD-1760 bus controller BC 110 to UAI 'R' messages for transmission to the UAI remote terminal 130, and the interface bridge 100 can convert UAI 'T' messages from the UAI remote terminal 130 to legacy 'T' messages for transmission to the MIL-STD-1760 bus controller BC 110. The 'R' messages and the 'T' messages can be transmitted via coaxial cables between the MIL-STD-1760 bus controller (BC) 110 and the interface bridge 100, and between the interface bridge 100 and the UAI remote terminal 130.

In one configuration, the interface bridge 100 can receive a message (e.g., a MIL-STD-1760 formatted message or a MIL-STD-1553 formatted message) from the MIL-STD-1760 bus controller 110. The message can comprise a given number or words, such as from 1 to 32 words, wherein each word is 16 bits.

Examples of the message can include a periodic transfer alignment message (sub address 02R), a time message (sub address 03R) or a target data message (sub address 17R). In the sub address, the number (e.g., 02) can refer to a message number (which can range from 1 to 30) and the 'R' is for 'receive'. The message transmitted from the MIL-STD-1760 bus controller 110 can be time tagged using one of two time stamping techniques—(1) a first time stamping technique, which corresponds to a data latency technique; and (2) a second time stamping technique, which corresponds to a time tag method of time stamping technique.

If the data latency technique is used, then the message transmitted from the MIL-STD-1760 bus controller 110 includes a time tag, which is likely a 16-bit value that indicates an age or latency of the message (i.e., the data latency). In other words, the time tag can indicate how old the message is on receipt. However, the data latency technique can be less accurate because the data latency technique does not account for transmission delays. If the time tag technique is used, then a second message that includes a data word is used to time tag the message transmitted from the MIL-STD-1760 bus controller 110. The second message is referred to as a mode code 17 (MC-17), or a synch with data mode code. In addition, the message can include the time tag, as in the data latency technique. In the time tag technique, an MC-17 time can be correlated to the time in the message received at the interface bridge 100, and then the interface bridge 100 can use an algorithm to determine how old the data actually is in the message received at the interface bridge 100 (which corresponds to the recomputed time tag). In contrast, in the data latency technique, no mode code 17 is used because the latency of the data (in the message) is directly specified through the time tag in the message. Both time tag techniques can function to determine the age of the data in the message.

In one example, the UAI remote terminal 130 can only support the time tag technique (i.e., it does not support the data latency technique). Therefore, if the aircraft platform 112 uses the data latency technique to derive the time tag in the message, the interface bridge 100 can convert the time tag on-the-fly to utilize the time tag technique (i.e., the interface bridge 100 can determine a recomputed time tag). After the interface bridge 100 determines the recomputed time tag, the interface bridge 100 can forward the message with the recomputed time tag to the UAI remote terminal 130. In other words, the interface bridge 100 can recompute and update the time tag in the message according to the time stamping technique using, for example, saved data validity times for a message sub address (e.g., 02R, 03R, 17R). The interface bridge 100 can update the time tag immediately before transmitting the message with the recomputed time tag to the UAI remote terminal 130. More specifically, the bus controller 126 of the interface bridge 100 can transmit a specific message (e.g., 2R or 3R) with the recomputed time tag to the UAI remote terminal 130. In one example, the UAI remote terminal 130 can reject (not use) messages that are not properly time tagged (i.e., in accordance with the time tag technique) or messages that are not received along with the MC-17s.

Prior solutions simply pass through the MC-17 (synch with data mode code) and messages with the time tags with a slight adjustment to a clock value (data word) to the MC-17. In these prior solutions, the latency of the data in the messages is not computed.

However, in examples of the present technology, the interface bridge 100 can support and implement both the data latency technique and the time tag technique by independently computing the data latency in each time-tagged message (for either time stamping technique), and maintaining data validity times (referenced to its own system clock) and storing them individually. The data validity time can be derived based on a receipt time of the message minus the data latency of the message (i.e., the value in the time tag). The interface bridge 100 can perform a real-time determination of the data latency and storage of the data validity time(s) upon receipt of the message that is time tagged using either time stamping technique (i.e., data latency or time tag), and then the interface bridge 100 can recompute the time tag using only the time tag technique for transmission to the UAI remote terminal 130. The interface bridge 100 can recompute the time tag in real-time and maintain time tag accuracy requirements, as the periodic transfer alignment message (PTAM), the time message and the target data message require accurately time tagged data. For example, the PTAM contains navigation data that has to be time tagged accurately in order to be used correctly. More specifically, the PTAM can be used to calculate an accurate navigation solution (e.g., position, velocity, orientation, pitch/roll/yaw), and the accuracy of the time tag can affect the accuracy of the navigation solution. In addition, the bus controller 126 of the interface bridge 100 can start transmitting MC-17s (e.g., nominally at a 0.5 Hz rate) at system startup. In one example, if the remote terminal 122 of the interface bridge 100 starts receiving MC-17s, then the periodic MC-17s from the bus controller 126 of the interface bridge 100 can be deactivated, and the MC-17s received by the remote terminal 122 of the interface bridge 100 can be passed through to the UAI remote terminal 130.

In one example, with the present technology, a new UAI weapon (e.g., SDB-II) can be integrated onto an aircraft platform (e.g., the aircraft platform 112) that implements a legacy 1760 messaging interface, such as for an air to ground weapon (e.g., JDAM or Enhanced Paveway™), wherein the aircraft platform 112 may only support the data latency technique of time stamping for the PTAM, time and target data messages. In other words, while older aircraft platforms 112 only support the data latency time stamping technique, UAI weapons only support the time tag technique. In order for the newer UAI weapons to be compatible with the older aircraft platforms 112, the newer UAI weapons need to receive a proper time tag. Therefore, the interface bridge 100 can recompute the time tag in the message in real-time, such that the message is properly time tagged (i.e., in accordance with the time tag technique) when received at the UAI weapon. As another example, in order to put the new UAI weapon (which only uses the time tag technique) on an older aircraft (e.g., an F18 aircraft, which can be between 20 to 30 years old) that does not use the time tag technique, the interface bridge 100 can act as an intermediary to convert from the data latency technique to the time tag technique with respect to the time tag in the message. Utilizing the interface bridge 100, the new UAI weapons can communicate with the aircraft platform 112 in order to be launched or receive targeting data or navigation data.

In one example configuration, the interface bridge 100 can receive the message (e.g., periodic transfer alignment message, time message, target data message) from the MIL-STD-1760 bus controller 110 on the aircraft platform 112. The message can include two separate fields that are related to time stamping. The first field can comprise the time tag, which can be a 16-bit value that indicates the age of the message. The second field can comprise a 16-bit rollover reset value. In the data latency technique, the rollover reset value is not used and the time tag can be set to the estimated latency of the data in the message being time tagged, wherein the data latency indicates how old the data is when received.

If the interface bridge 100 detects that a particular bit in the message is set to "1" (e.g., 2R/03/13), then this indicates that the message is time tagged using the data latency technique. As an example, in 2R/03/13, the "2" can indicate a message number (or sub address), and the "R" can indicate that it is a receive message (e.g., the message is received at the UAI remote terminal 130). In this example, "2R" is the periodic transfer alignment message. The messages can be numbered from 1 to 30. Furthermore, in 2R/03/13, the "3" can indicate a word number and the "13" can indicate a bit number. Each word can be 16 bits. Therefore, if there is a "1" in the $13^{th}$ bit of word 3 in the 2R message, then the interface bridge 100 can determine that the message is time tagged using the data latency technique. In this case, the interface bridge 100 can recalculate or update the time tag using the time tag technique.

More specifically, the bus controller 126 of the interface bridge 100 can start sending mode code 17s (MC-17s) to the UAI remote terminal 130, such as every two seconds at system startup. The MC-17 contains a data word, which is a 16-bit clock value (the least significant bit scale is 64 microseconds) that is read at the time of MC-17 transmission. The clock value can be continuously going, but it can roll over every several seconds (e.g., approximately every 4.19 seconds). The MC-17 can be used as a "time hack," or to convey a current time. In other words, the MC-17 can notify the UAI remote terminal 130 that the interface bridge's 16-bit clock value is a particular value when the message is received at the UAI remote terminal 130.

In one example, the same 16-bit dock that is used for the MC-17 can be used to update the time tag in the message. For example, when the remote terminal 122 of the interface bridge 100 receives the message from the MIL-STD-1760 bus controller 110, the remote terminal 122 of the interface bridge 100 can compute the corresponding 16-bit clock value that corresponds to the time the data was valid. As an example, if the remote terminal 122 of the interface bridge 100 receives a message that has a data latency that is 64 milliseconds, then the remote terminal 122 of the interface bridge 100 can compute the corresponding value of the 16-bit clock used for the MC-17. In this example, 64 milliseconds, or 0.064 seconds, corresponds to an integer value of the data latency word, which is 1000 with an ISB of 0.000064 seconds. In this case, the remote terminal 122 of the interface bridge 100 can subtract the data latency (or 1000) from the 16-bit clock value at the time of receipt of the MC-17 (which corresponds to a real time clock (RTC) value) in order to derive the recomputed time tag. The data latency can be subtracted from the 16-bit clock value (RTC value) when the 16-bit clock value is greater than the data latency. Therefore, before the bus controller 126 of the interface bridge 100 retransmits the message to the weapon platform 132, the interface bridge 100 can update two 16-bit words in the outgoing message—the time tag and the rollover reset value. As a result, the message that is received at the weapon platform 132 can have accurate time tagged data.

In one example, the rollover reset value is a maximum value before the clock is reset to zero. For the interface bridge 100, the clock can "free run," but the clock can rollover to zero when it gets to FFFF (hex), or 65535. In one example, if the 16-bit value is less than the data latency (i.e., the data latency subtracted from the 16-bit clock value would result in a negative value), then a (rollover reset value+1) can be added to the value of the 16-bit clock. In this example, (rollover reset value+1) is equal to 65536 (0x10000). Therefore, if the data latency is 500, when the message is resent by the bus controller 126 of the interface bridge 100, the value of the time tag word in the message is a difference between 65536 and 500, or (65536-500) plus the value of the 16-bit clock (RTC value). In some cases, the messages can be time tagged by a different system clock (e.g., 32-bit, 48-bit or 64-bit), but the net effect is the same.

In one example, an aircraft store can include any device intended for internal or external carriage and mounted on aircraft suspension and release equipment, whether or not the item is intended to be separated inflight from the aircraft. Aircraft stores can be classified in two categories: an expendable store and a nonexpendable store. The expendable store may normally be separated from the aircraft in flight such as a missile, rocket, bomb, nuclear weapon, mine, torpedo, pyrotechnic device, sonobuoy, signal underwater sound device, or other similar items. The nonexpendable store may not normally be separated from the aircraft in flight such as a tank (e.g., fuel and spray), line-source disseminator, pod (e.g., refueling, thrust augmentation, gun, electronic attack, and data link), multiple rack, target, cargo drop container, drone or other similar items.

In one example, the aircraft platform 112 can include various types of aerial vehicles, such as attack aircraft or fighter aircraft (e.g., Boeing or McDonnell Douglas F/A-18 C/D/E/F Hornet, Lockheed Martin or General Dynamics F-16 Fighting Falcon, Northrop Grumman B-2A (i.e., Stealth Bomber), or Boeing B-52H Stratofortress) or unmanned aerial vehicle (UAV) (e.g., General Atomics MQ-1 Predator or MQ-9 Reaper (Predator-B)).

In one example, the carriage platforms that can operate with the interface bridge 100 can include the bomb release unit-55 (BRU-55) (used by the U.S. Department of the Navy (DoN)), and that allows carriage of two smart weapons (e.g., dual weapons up to the 1000 lb class) on a single aircraft platform, BRU-33 (dual weapon carriage used by the U.S. Marines), BRU-57 (dual weapon carriage used by the U.S. Air Force (USAF)), munitions armament unit-46 (MAU-46), BRU-71/A, smart bomb rack assembly (SBRA) (including 20 weapons), or heavy stores adapter beam (HSAB) (including 9 weapons for external munitions on USAF B-52H).

In one example, the legacy (non-UAI) interface (i.e., the MIL-STD-1760 interface) can use a message format for an MIL-STD-1760 precision guided munitions (PGM) mission store. The MIL-STD-1760 precision guided munitions mission store include Guided Bomb Unit-31/32/38 (GBU-31/32/38) Joint Direct Attack Munitions (JDAM); Air-to-Ground Missile-154 (AGM-154) Joint Standoff Weapon (JSOW); Enhanced GBU-24/27/28 (EGBU-24/27/28) Enhanced Paveway™; Cluster Bomb Unit-103 (CBU-103), CBU-104, or CBU-105 Wind Corrected Munitions Dispensers (WCMDs); Air-launched Decoy Missile-160B/C (ADM-160B/C) Miniature Air Launched Decoy (MALD); or AGM-158 Joint Air-to-Surface Stand-Off Missile (JASSM). The message format (i.e., legacy (non-UAI) format) for an MIL-STD-1760 PGM mission store can use message structures and definitions conforming to a legacy weapon Interface Control Document (ICD).

Although MIL-STD-1760 defines some standard messages and interface protocols, a significant portion of the message formats can be unique to the particular weapon. The Universal Armament Interface (UAI) specifications delineate standard message structures for message sub addresses. The platform and/or the weapon has the capability to customize or tailor portions of the interface based on supported functionality. Without changing the UAI specification, neither the platform nor the store (e.g., aircraft store) may define new message formats or fields within a message. Thus, the UAI specification can be a common interface that can simplify the integration of the various platform and/or store interface combinations.

As established weapons implement the UAI, these weapons may continue to support their legacy interface so that these weapons can continue to work on platforms that have not implemented UAI. A weapon system (e.g., SDB-II) may be designed as a UAI weapon without a legacy interface. The cost for existing platforms to implement UAI can be expensive. Additionally, a weapon, such as SDB-II, can use advanced UAI features that previously integrated weapons did not use, which advanced features may not be supported in the platform avionics. The technology (e.g., interface bridge, methods, computer circuitry, and systems) described herein can provide mechanisms to implement a UAI weapon (e.g., SDB-II) on a legacy MIL-STD-1760 platform (on an aircraft) without requiring major changes to the aircraft avionics software and without requiring the platform to implement UAI capability. In addition, the technology described herein can perform real-time time tag conversion for messages communicated from the legacy MIL-STD-1760 platform on the aircraft to the UAI weapon.

In one example configuration, the data latency technique can be defined according to the Enhanced Paveway Interface Control Document (ICD). With respect to host aircraft requirements, if estimated latency message time stamps are employed: (a) the host aircraft can {AS-117} select the estimated latency time stamp technique in all estimated latency time stamped messages, such as [2R/03/13=1] or [3R/07/00=1]; (b) the host aircraft can {AS-118} indicate a delta time between data validity and receipt of the time stamped message (last zero crossing of the last data word) by the weapon in all estimated latency time stamped messages, such as [2R/05] or [3R/09] (estimated latencies are compensated for known transmission delays); (c) estimated latencies may {AS-140} not exceed 300 msec; and (d) the time at host aircraft clock reset in time stamped messages need not be provided. As an example, [2R/04=don't care], [3R/08=don't care]. With respect to the weapon requirements, if estimated latency message time stamps are employed by the host aircraft, such as [2R/03/13=1] or [3R/07/00=1], the weapon can {WS-156} compute the data validity time as the time of receipt of the time stamped message [2R], [3R] minus the estimated latency [2R/05], [3R/09] provided in the time stamped message.

Figure 2:
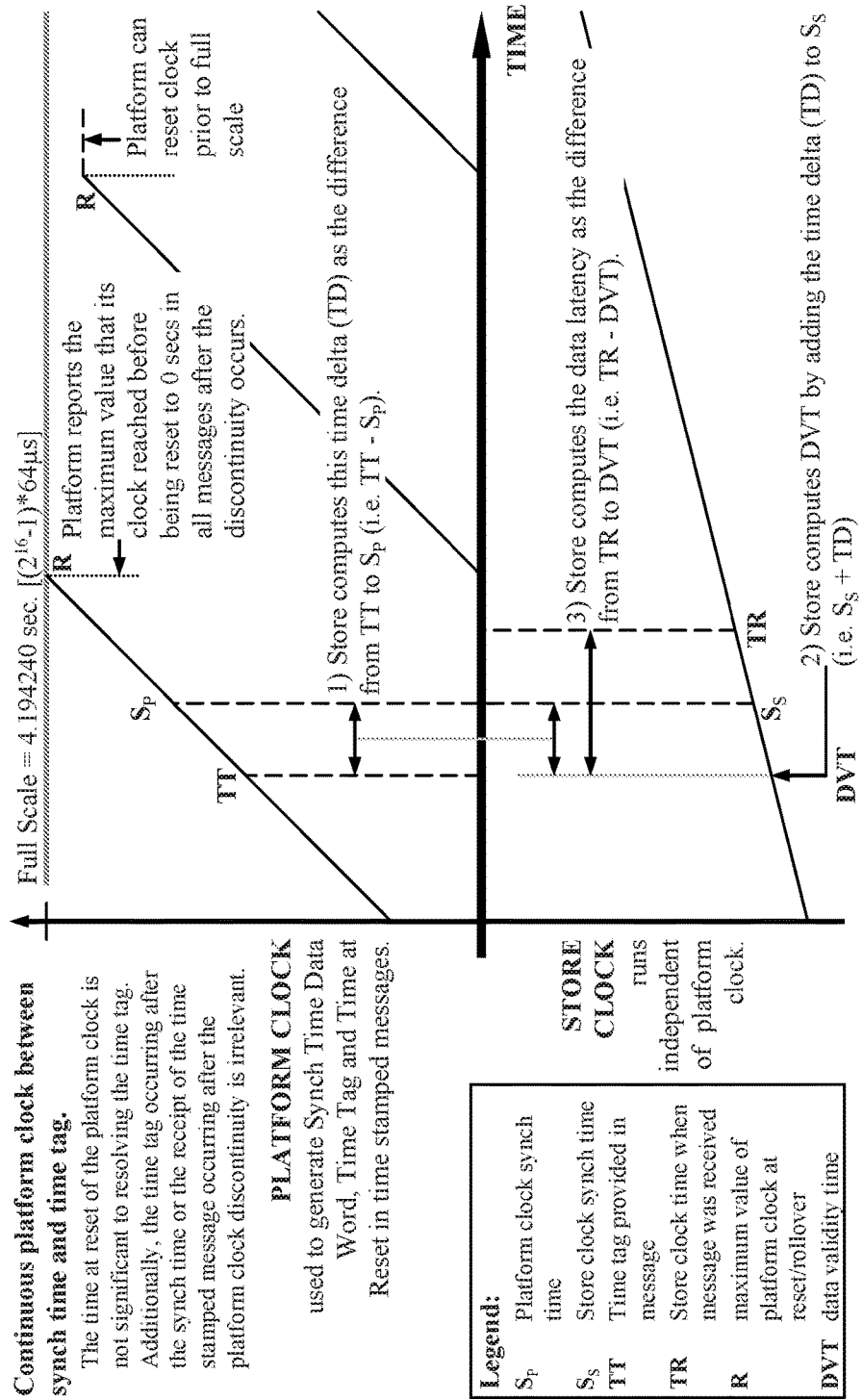
FIG. 2 is a diagram that illustrates a time stamping technique for time stamping a message in accordance with an example.

FIG. 2 is an exemplary diagram that illustrates a time tag technique for time stamping a message. The time tag technique can be defined in accordance with a Universal Armament Interface (UAI) Interface Control Document (ICD). A platform clock can be used to generate a synch time data word (MC-17), a time tag and a time at reset in time tagged messages. A store clock can run independent of the platform clock. In step 1, a time delta (TD) can be computed as a difference between a time tag provided in the message (TT) and a platform clock synch time ($S_p$), or $TD=TT-S_p$. In step 2, a data validity time (DVT) can be computed by adding the time delta (TD) to a store clock synch time ($S_s$), or $DVT=S_s+TD$. In step 3, a data latency can be computed as a difference between a store clock time when the message was received (TR) and the DVT, or TR−DVT. In one example 'R' can represent a maximum value of the platform clock at a reset/rollover. The maximum value that is reached by the platform clock can be reported before being reset to 0 secs in all messages after the discontinuity occurs.

Figure 3:
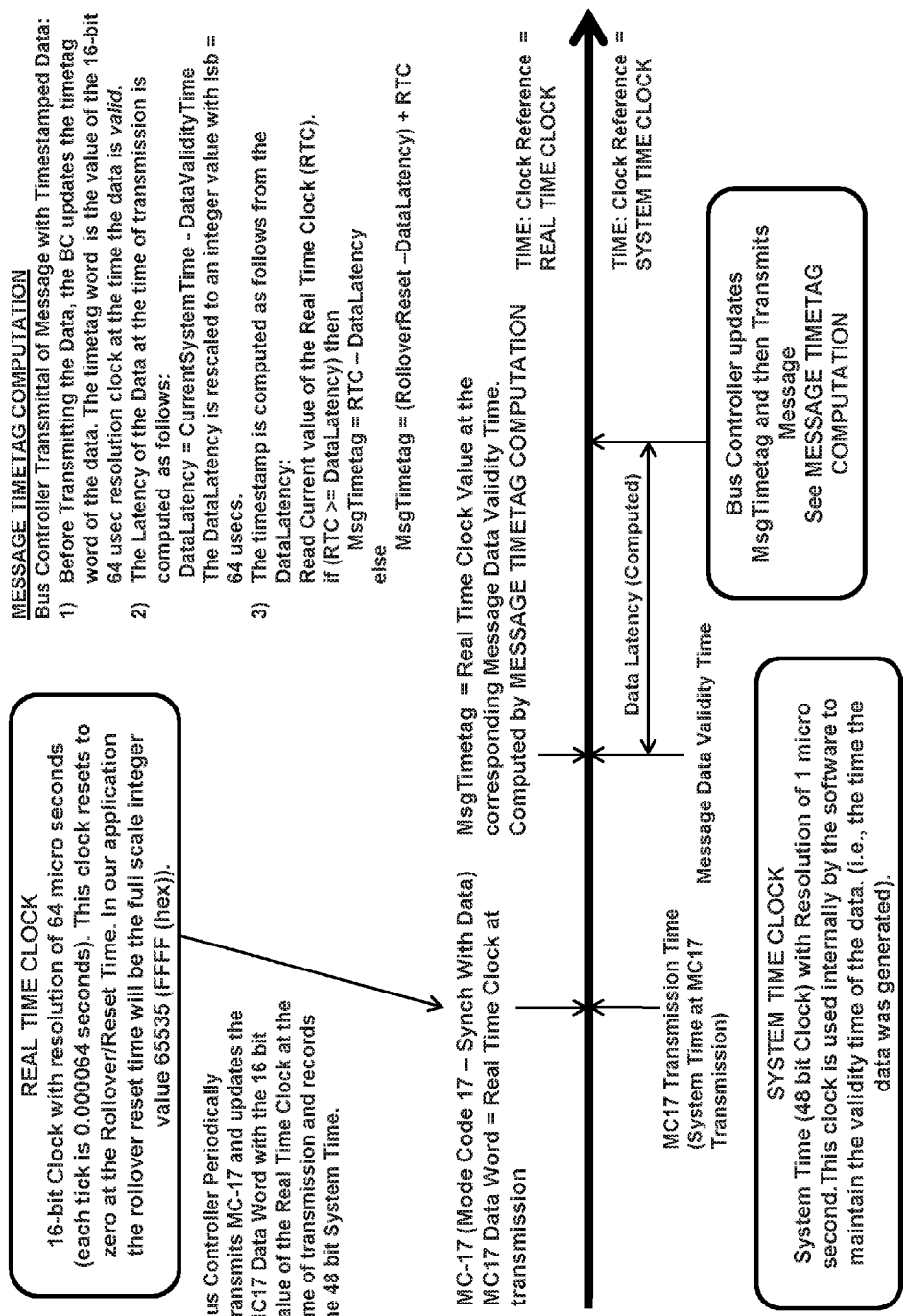
FIG. 3 is an additional diagram that illustrates a time stamping technique for time stamping a message in accordance with an example.

FIG. 3 is an additional exemplary diagram that illustrates a time tag technique for time stamping a message. The time tag technique can be defined in accordance with a Universal Armament Interface (UAI) Interface Control Document (ICD). A real time clock (RTC) is a 16-bit clock with a resolution of 64 micro seconds (e.g., each increment is 0.000064 seconds). The real time clock (RTC) can be reset to zero at a rollover/reset time. In one example, the rollover reset time is a full scale integer value of 655535, which corresponds to a hexadecimal value of FFFF. A system time clock is a 48-bit clock with a resolution of 1 microsecond. The system time clock can be used internally by a software application to maintain a validity time of data in the message (i.e., the time at which the data was generated).

In one example, a bus controller can periodically transmit MC-17s and update a MC-17 data word with the 16-bit value of the real time clock (RTC) at the time of transmission, as well as record the 48-bit system time. The MC-17 is a synch with data mode code, and the MC-17 data word can be equal to the real time clock (RTC) value at the time of transmission.

In one example, the bus controller can transmit the message with time tagged data, but before transmitting the message, the bus controller can update the time tag word of the data. The time tag word is the value of the 16-bit 64 usec resolution clock at the time the data is valid. In one example, a latency of the data at the time of transmission is computed as follows: DataLatency=CurrentSystemTime−DataValidityTime, wherein the DataLatency is rescaled to an integer value with lsb=64 usecs. The time tag can be computed from the DataLatency. A current value of the real time clock (RTC) can be read, and if the real time clock (RTC) value is greater than the DataLatency (RTC>=DataLatency), then a message time tag (MsgTimetag) is equal to the difference between the real time clock (RTC) value and the DataLatency, or MsgTimetag=RTC−DataLatency. Otherwise, the message time tag (MsgTimetag) is equal to a difference between a rollover reset value (RolloverReset) and the DataLatency, and plus the real time clock (RTC) value, or MsgTimetag=(RolloverReset−DataLatency)+RTC. Therefore, the message time tag (MsgTimetag) is equal to a real time clock (RTC) value at a corresponding message data validity time. In one example, the bus controller can update the message time tag (MsgTimetag), and then transmit the message with the message time tag (MsgTimetag).

Figure 4:
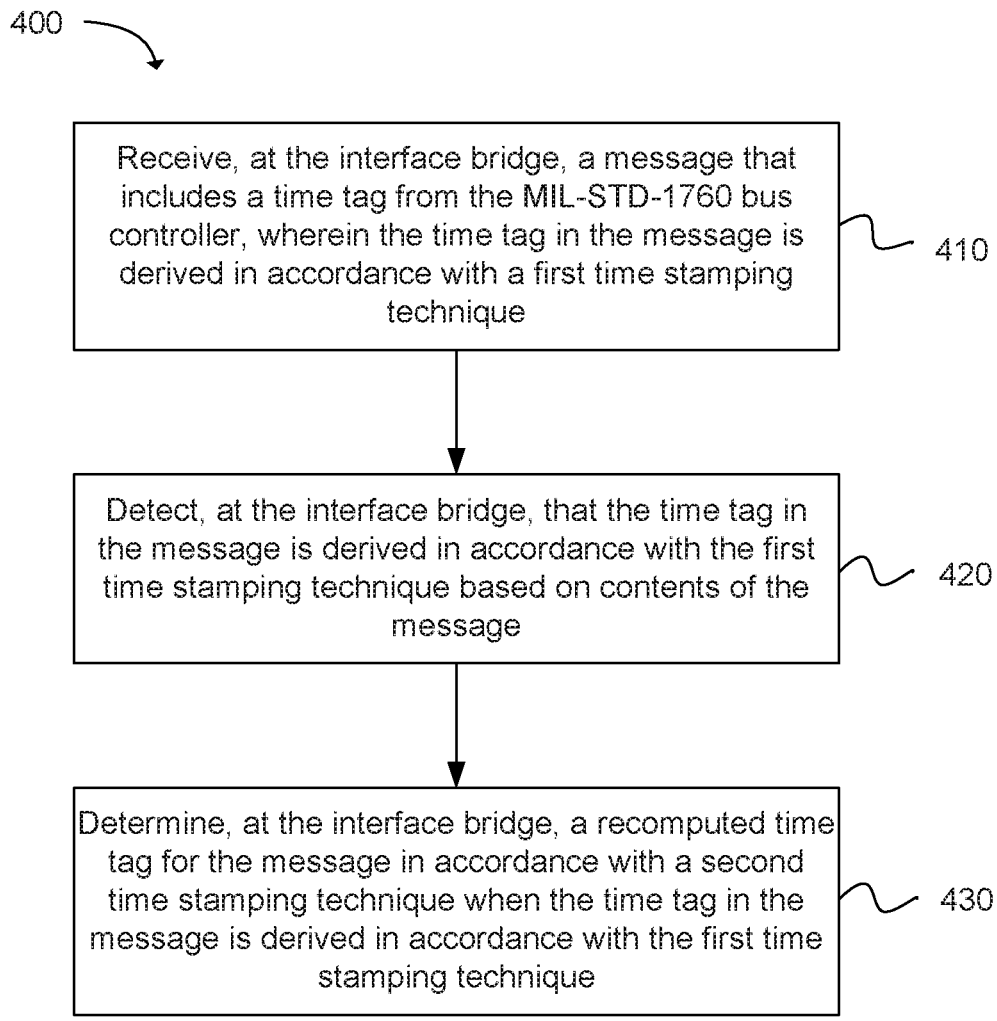
FIG. 4 depicts functionality of an interface bridge positioned between a military standard-1760 (MIL-STD-1760) bus controller and a Universal Armament Interface (UAI) remote terminal in accordance with an example.

FIG. 4 illustrates exemplary functionality of an interface bridge positioned between a military standard-1760 (MIL-STD-1760) bus controller and a Universal Armament Interface (UAI) remote terminal. The interface bridge can include one or more processors and memory configured to: receive, at the interface bridge, a message that includes a time tag from the MIL-STD-1760 bus controller, wherein the time tag in the message is derived in accordance with a first time stamping technique, as shown in block 410. The interface bridge can include one or more processors and memory configured to: detect, at the interface bridge, that the time tag in the message is derived in accordance with the first time stamping technique based on contents of the message, as shown in block 420. The interface bridge can include one or more processors and memory configured to: determine, at the interface bridge, a recomputed time tag for the message in accordance with a second time stamping technique when the time tag in the message is derived in accordance with the first time stamping technique, as shown in block 430.

In one example, the interface bridge can be further configured to transmit the message with the recomputed time tag to the UAI remote terminal. In one example, the message with the time tag is received at a remote terminal (RT) side of the interface bridge and the message with the recomputed time tag is transmitted from a bus controller (BC) side of the interface bridge to the UAI remote terminal.

In one example, the interface bridge can be further configured to determine the recomputed time tag in the message by: identifying, at the interface bridge, a mode code 17 (MC-17) message that contains a data word of a current clock value, wherein a real time clock (RTC) at the interface bridge is set equal to the data word in the MC-17 message; computing, at the interface bridge, a clock value that corresponds to the time tag included in the message, wherein the clock value corresponds to a latency of data included in the message; and subtracting, at the interface bridge, the clock value that corresponds to the time tag from the RTC in order to determine the recomputed time tag, wherein the recomputed time tag is in accordance with the second time stamping technique.

In one example, the clock value included in the data word and the clock value that corresponds to the time tag are 16-bit clock values. In one example, the interface bridge can be further configured to transmit the message with the recomputed time tag and the MC-17 message that contains the data word of the current clock value to the UAI remote terminal.

In one example, the interface bridge can be further configured to determine the recomputed time tag in the message by: identifying a mode code 17 (MC-17) message that contains a data word of a current clock value, wherein a real time clock (RTC) at the interface bridge is set equal to the data word in the MC-17 message; computing a clock value that corresponds to the time tag included in the message, wherein the clock value corresponds to a latency of data included in the message; and subtracting the clock value that corresponds to the time tag from a rollover reset value and adding the RTC in order to determine the recomputed time tag, wherein the rollover reset value is included in the message from the MIL-STD-1760 bus controller.

In one example, the time tag is a 16-bit value that indicates an age or latency of the message when received at the interface bridge. In one example, the interface bridge is configured to determine the recomputed time tag in the message in accordance with the second time stamping technique when the UAI remote terminal is configured to reject messages that are not time tagged in accordance with the second time stamping technique. In one example, the MIL-STD-1760 bus controller is onboard an aircraft and the UAI remote terminal is associated with a weapon platform.

In one example, the MIL-STD-1760 bus controller operates as a standard 1553 bus controller and the UAI remote terminal operates as an enhanced bit rate (EBR)-1553 remote terminal. In one example, the first time stamping technique is a data latency technique and the second time stamping technique is a time-tag technique. In one example, the message received from the MIL-STD-1760 bus controller is one of: a periodic transfer alignment message, a time message or a target data message. In one example, the interface bridge is configured to convert messages in a MIL-STD-1760 data format received from the MIL-STD-1760 bus controller to messages in a UAI data format for transmission to the UAI remote terminal.

Figure 5:
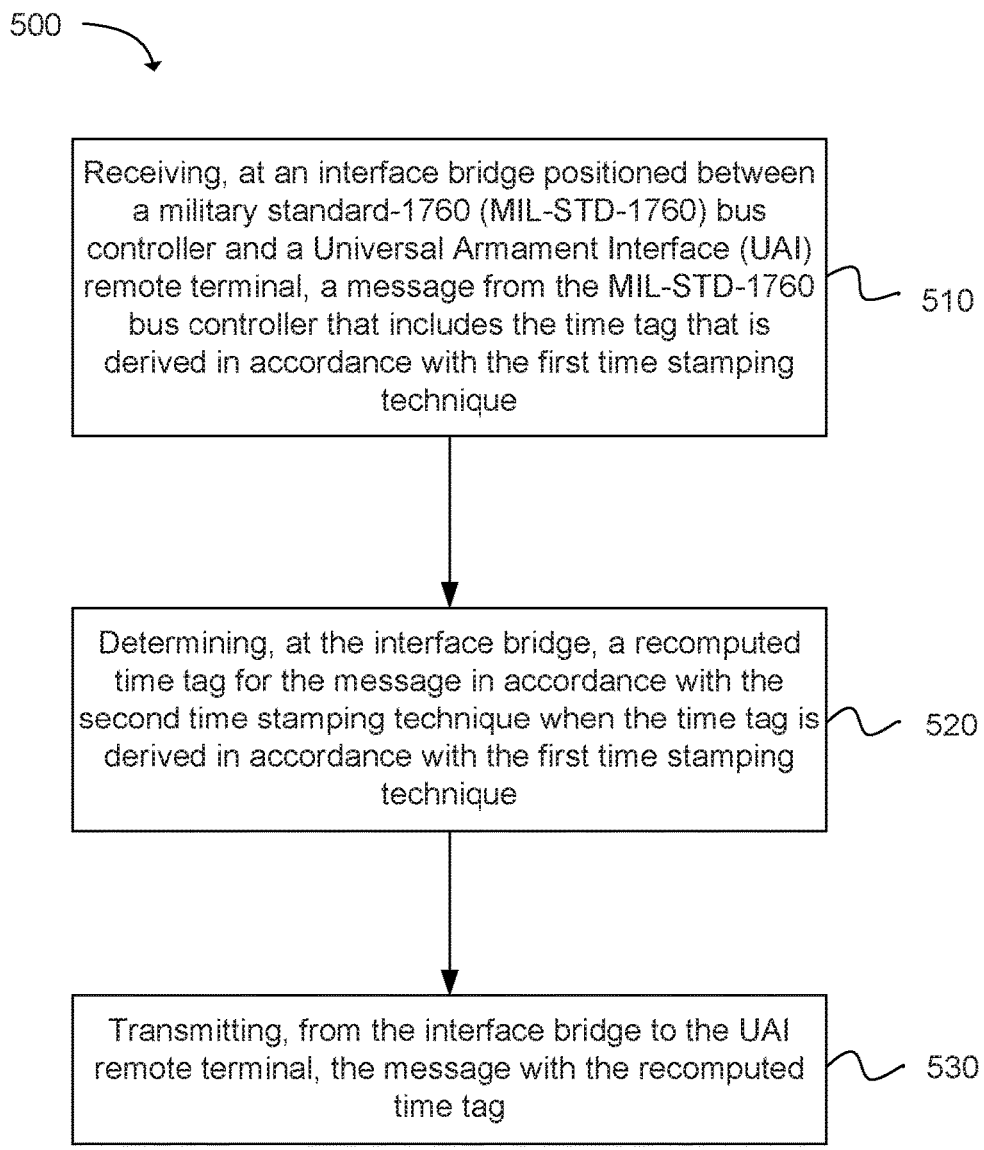
FIG. 5 depicts a flowchart of a method for converting a time tag derived using a first time stamping technique to a time tag that uses a second time stamping technique in accordance with an example.

FIG. 5 illustrates a method for converting a time tag derived using a first time stamping technique to a time tag that uses a second time stamping technique. The method can be executed as instructions on a machine, where the instructions are included on at least one computer readable medium or one non-transitory machine readable storage medium. The method can include the operation of: receiving, at an interface bridge positioned between a military standard-1760 (MIL-STD-1760) bus controller and a Universal Armament Interface (UAI) remote terminal, a message from the MIL-STD-1760 bus controller that includes the time tag that is derived in accordance with the first time stamping technique, as shown in block 510. The method can include the operation of: determining, at the interface bridge, a recomputed time tag for the message in accordance with the second time stamping technique when the time tag is derived in accordance with the first time stamping technique, as in block 520. The method can include the operation of: transmitting, from the interface bridge to the UAI remote terminal, the message with the recomputed time tag, as in block 530.

In one example, the method can further comprise detecting that the time tag in the message received from the MIL-STD-1760 bus controller is derived in accordance with the first time stamping technique based on contents of the message.

In one example, the step of determining the recomputed time tag in the message further comprises: identifying a mode code 17 (MC-17) message that contains a data word of a current clock value, wherein a real time clock (RTC) at the interface bridge is set equal to the data word in the MC-17 message; computing a clock value that corresponds to the time tag included in the message, wherein the clock value corresponds to a latency of data included in the message; and subtracting the clock value that corresponds to the time tag from the RTC in order to determine the recomputed time tag, wherein the recomputed time tag is in accordance with the second time stamping technique.

In one example, the method can further comprise transmitting the message with the recomputed time tag and the MC-17 message that contains the data word of the current clock value to the UAI remote terminal.

In one example, the step of determining the recomputed time tag in the message further comprises: identifying a mode code 17 (MC-17) message that contains a data word of a current clock value, wherein a real time clock (RTC) at the interface bridge is set equal to the data word in the MC-17 message; computing a clock value that corresponds to the time tag included in the message, wherein the clock value corresponds to a latency of data included in the message; and subtracting the clock value that corresponds to the time tag from a rollover reset value and adding the RTC in order to determine the recomputed time tag, wherein the rollover reset value is included in the message from the MIL-STD-1760 bus controller.

Figure 6:
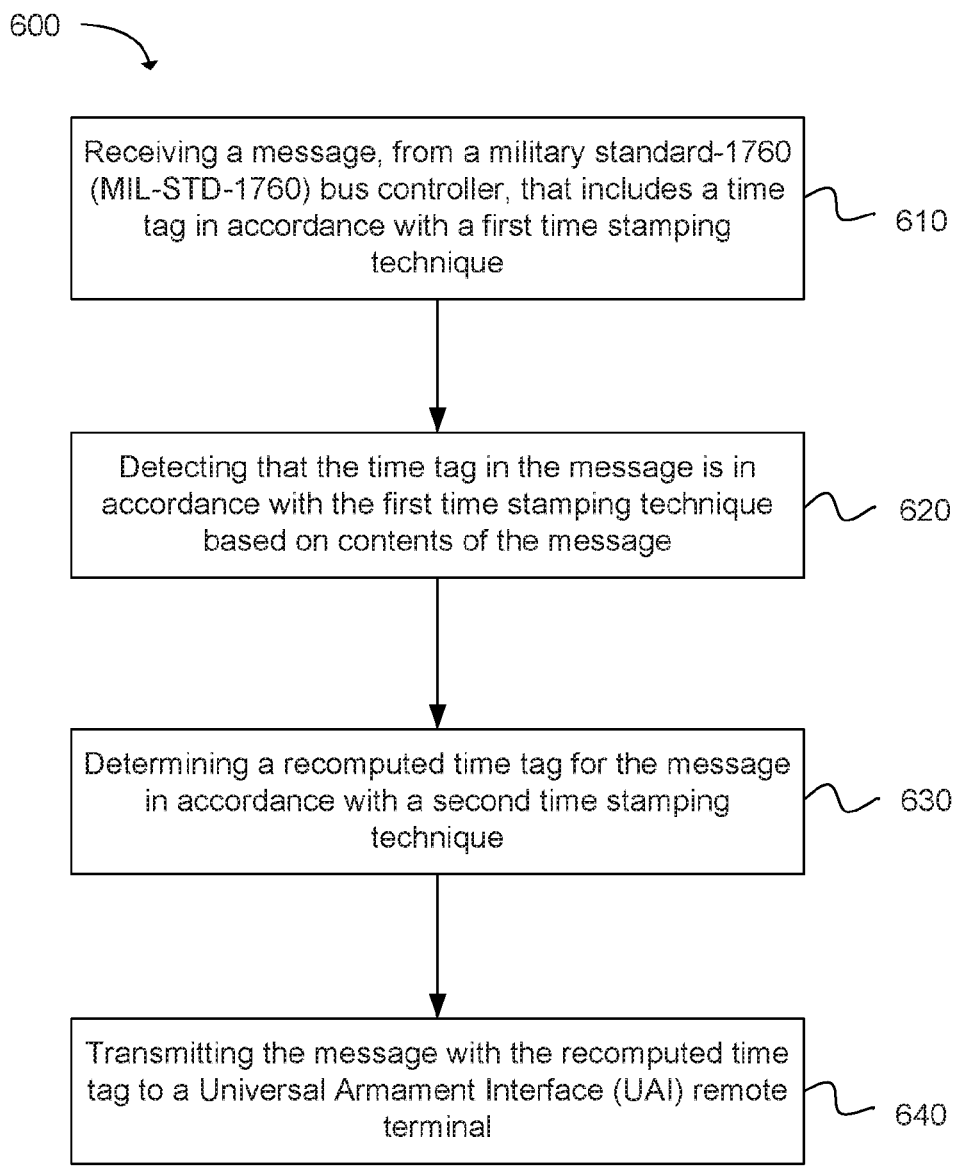
FIG. 6 depicts a flowchart of a method for time stamp conversion within a message in accordance with an example.

FIG. 6 illustrates an exemplary method for time tag conversion within a message. The method can be executed as instructions on a machine, where the instructions are included on at least one computer readable medium or one non-transitory machine readable storage medium. The method can include the operation of: receiving a message, from a military standard-1760 (MIL-STD-1760) bus controller, that includes a time tag in accordance with a first time stamping technique, as shown in block 610. The method can include the operation of: detecting that the time tag in the message is in accordance with the first time stamping technique based on contents of the message, as shown in block 620. The method can include the operation of determining a recomputed time tag for the message in accordance with a second time stamping technique, as shown in block 630. The method can include the operation of: transmitting the message with the recomputed time tag to a Universal Armament Interface (UAI) remote terminal, as shown in block 640.

In one example, the method can further comprise converting the message received from the MIL-STD-1760 bus controller from a MIL-STD-1760 data format received to a UAI data format prior to transmission of the message to the UAI remote terminal. In one example, the recomputed time tag is determined using an interface bridge that is positioned in line between the MIL-STD 1760 bus controller and the UAI remote terminal. In one example, the MIL-STD-1760 bus controller is onboard an aircraft and the UAI remote terminal is associated with a weapon platform.

Various techniques, or certain aspects or portions thereof, may take the form of program code (i.e., instructions) embodied in tangible media, such as floppy diskettes, compact disc-read-only memory (CD-ROMs), digital versatile disc (DVD), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The interface bridge device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that some of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" or "configuration" means that a particular feature, structure, or characteristic described in connection with the example is included in at least one embodiment of the present invention. Thus, appearances of the phrases "in an example" or "in a configuration" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An interface bridge positioned between a military standard-1760 (MIL-STD-1760) bus controller of a legacy platform and a Universal Armament Interface (UAI) remote terminal of a UAI weapon to convert a time tag derived using a first time stamping technique that is within a message sent by the legacy platform to a time tag that uses a second time stamping technique that is compatible with the UAI weapon, the interface bridge comprising one or more processors and memory configured to:
   receive, at the interface bridge, a message that includes the time tag from the MIL-STD-1760 bus controller, wherein the time tag in the message is derived in accordance with the first time stamping technique which is incompatible with the UAI remote terminal;
   detect, at the interface bridge, that the time tag in the message is derived in accordance with the first time stamping technique based on contents of the message; and
   determine, at the interface bridge, a recomputed time tag for the message in accordance with a second time stamping technique when the time tag in the message is derived in accordance with the first time stamping technique, wherein the recomputed time tag is determined by:
      reading a value of a real time clock (RTC) upon receiving the message from the MIL-STD-1760 bus controller at the interface bridge and storing the value of the RTC as a message receipt time, wherein the message from the MIL-STD-1760 bus controller includes a latency value,
      computing a clock value that corresponds to the recomputed time tag of the message to be sent by the interface bridge to the UAI remote terminal, and at least one of
      subtracting the latency value from the message receipt time in order to determine the recomputed time tag, or
      subtracting the latency value from the clock value that corresponds to a rollover reset value of the RTC and adding the message receipt time in order to determine the recomputed time tag.

2. The interface bridge of claim 1, wherein the one or more processors and memory are further configured to transmit the message with the recomputed time tag to the UAI remote terminal.

3. The interface bridge of claim 2, wherein the message with the time tag is received at a remote terminal (RT) side of the interface bridge and the message with the recomputed time tag is transmitted from a bus controller (BC) side of the interface bridge to the UAI remote terminal.

4. The interface bridge of claim 1, wherein the clock value that corresponds to the recomputed time tag is a 16-bit clock value.

5. The interface bridge of claim 1, wherein the one or more processors and memory are further configured to transmit a mode code 17 (MC-17) message that contains a value of the RTC at the time of transmission to the UAI remote terminal.

6. The interface bridge of claim 1, wherein the time tag is a 16-bit value that indicates an age or latency of the message when received at the interface bridge.

7. The interface bridge of claim 1, wherein the interface bridge is configured to determine the recomputed time tag in the message in accordance with the second time stamping technique when the UAI remote terminal is configured to reject messages that are not time tagged in accordance with the second time stamping technique.

8. The interface bridge of claim 1, wherein the MIL-STD-1760 bus controller is onboard an aircraft and the UAI remote terminal is associated with a weapon platform.

9. The interface bridge of claim 1, wherein the MIL-STD-1760 bus controller operates as a standard 1553 bus controller and the UAI remote terminal operates as an enhanced bit rate (EBR)-1553 remote terminal.

10. The interface bridge of claim 1, wherein the first time stamping technique is a data latency technique and the second time stamping technique is a time-tag technique.

11. The interface bridge of claim 1, wherein the message received from the MIL-STD-1760 bus controller is one of a periodic transfer alignment message, a time message and a target data message.

12. The interface bridge of claim 1, wherein the interface bridge is configured to convert messages in a MIL-STD-1760 data format received from the MIL-STD-1760 bus controller to messages in a UAI data format for transmission to the UAI remote terminal.

13. A method for converting a time tag derived using a first time stamping technique that is within a message sent by a legacy platform to a time tag that uses a second time stamping technique that is compatible with a Universal Armament Interface (UAI) weapon, the method comprising:
receiving, at an interface bridge positioned between a military standard-1760 (MIL-STD-1760) bus controller of the legacy platform and a UAI remote terminal of the UAI weapon, a message from the MIL-STD-1760 bus controller that includes the time tag that is derived in accordance with the first time stamping technique which is incompatible with the UAI remote terminal;
determining, at the interface bridge, a recomputed time tag for the message in accordance with the second time stamping technique when the time tag is derived in accordance with the first time stamping technique, wherein determining the recomputed time tag comprises:
reading a value of a real time clock (RTC) upon receiving the message from the MIL-STD-1760 bus controller at the interface bridge and storing the value of the RTC as a message receipt time, wherein the message from the MIL-STD-1760 bus controller includes a latency value,
computing a clock value that corresponds to the recomputed time tag of the message to be sent by the interface bridge to the UAI remote terminal, and at least one of
subtracting the latency value from the message receipt time in order to determine the recomputed time tag, or
subtracting the latency value from the clock value that corresponds to a rollover reset value of the RTC and adding the message receipt time in order to determine the recomputed time tag; and
transmitting, from the interface bridge to the UAI remote terminal, the message with the recomputed time tag.

14. The method for claim 13, further comprising detecting that the time tag in the message received from the MIL-STD-1760 bus controller is derived in accordance with the first time stamping technique based on contents of the message.

15. The method of claim 13, further comprising transmitting a mode code 17 (MC-17) message that contains a value of the RTC at the time of transmission to the UAI remote terminal.

16. A method for conversion of a time tag within a message sent by a legacy platform to a time tag that is compatible with a Universal Armament Interface (UAI) weapon, the method comprising:
receiving a message, from a military standard-1760 (MIL-STD-1760) bus controller of the legacy platform, that includes a time tag in accordance with a first time stamping technique which is incompatible with the UAI weapon;
detecting that the time tag in the message is in accordance with the first time stamping technique based on contents of the message;
determining a recomputed time tag for the message in accordance with a second time stamping technique, wherein determining the recomputed time tag comprises:
reading a value of a real time clock (RTC) upon receiving the message from the MIL-STD-1760 bus controller and storing the value of the RTC as a message receipt time, wherein the message from the MIL-STD-1760 bus controller includes a latency value,
computing a clock value that corresponds to the recomputed time tag of the message to be sent to the UAI weapon, and at least one of
subtracting the latency value from the message receipt time in order to determine the recomputed time tag, or
subtracting the latency value from the clock value that corresponds to a rollover reset value of the RTC and adding the message receipt time in order to determine the recomputed time tag; and
transmitting the message with the recomputed time tag to a UAI remote terminal of the UAI weapon.

17. The method of claim 16, further comprising converting the message received from the MIL-STD-1760 bus controller from a MIL-STD-1760 data format received to a UAI data format prior to transmission of the message to the UAI remote terminal.

18. The method of claim 16, wherein the recomputed time tag is determined using an interface bridge that is positioned in line between the MIL-STD 1760 bus controller and the UAI remote terminal.

19. The method of claim 16, wherein the MIL-STD-1760 bus controller is onboard an aircraft and the UAI remote terminal is associated with a weapon platform.

20. The method of claim 16, further comprising transmitting the rollover reset value of the RTC to the UAI remote terminal.

21. The method of claim 13, wherein the first time stamping technique is a data latency technique and the second time stamping technique is a time-tag technique.

22. The method of claim 13, further comprising transmitting, from the interface bridge to the UAI remote terminal, the rollover reset value of the RTC.

23. The method of claim 13, wherein the rollover reset value is a maximum value before the RTC is reset to zero.

* * * * *